Feb. 15, 1927.
J. FAZIO
FRUIT JUICE EXTRACTING AND DISPLAY DEVICE
Filed Dec. 12, 1923
1,617,383
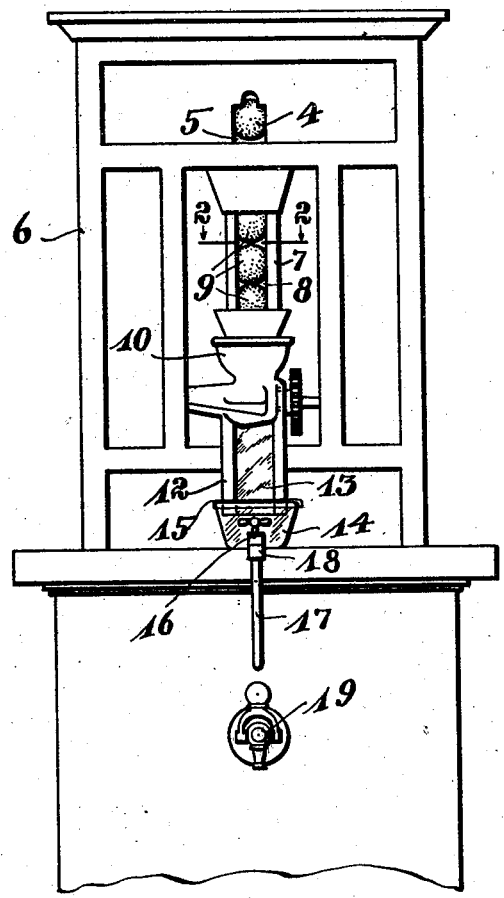
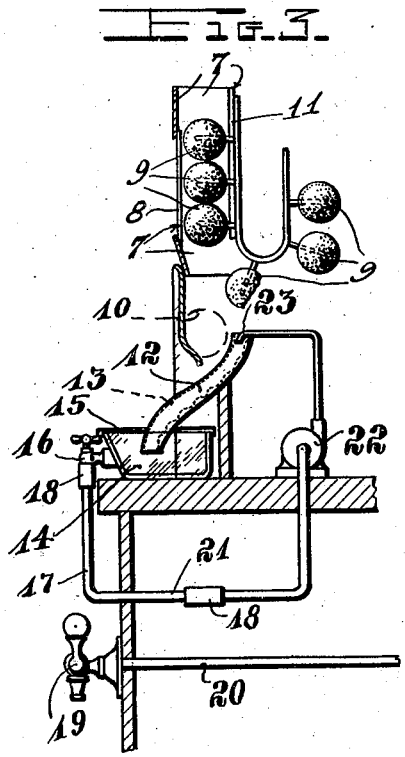
INVENTOR:
JAMES FAZIO,
By: Otto H. Krueger.
his Atty.

Patented Feb. 15, 1927.

1,617,383

UNITED STATES PATENT OFFICE.

JAMES FAZIO, OF VENICE, CALIFORNIA.

FRUIT-JUICE EXTRACTING AND DISPLAY DEVICE.

Application filed December 12, 1923. Serial No. 680,175.

This invention relates to devices used for extracting the juice from fruit, and used to display in a simulating manner the extracting of juice from fruit.

One of the objects of this invention is to provide a funnel-like structure with an open front in which a number of fruits can be made to appear as if piled one on top of another to be crushed.

Another object is to provide such a funnel-like structure to allow a continuous slow feeding into a juice extracting device.

Another object is to provide such a funnel-like structure of such a form to display a slow continuous feeding of fruit to patrons of juice dispensing stands.

Another object is to provide such a funnel-like structure of such a form to simulate a slow continuous feeding of fruit into a fruit-juice extracting device.

Another object is to simulate a steady and continuous extracting of fruit puice by providing a visible fluid-conducting means in conjunction with such a steady and continuous fruit-feeding means.

Other objects will appear from the following description and appended claims as well as from the accompanying drawing, in which—

Fig. 1 is a front elevation of the funnel-like structure with the open front above a device of a form of a fruit-crusher and having fluid-conducting means below the fruit crusher.

Fig. 2 is a cross section through the funnel-like structure on line 2—2 of Fig. 1.

Fig. 3 is a side elevation of the fluid conducting means, and apparatus for circulating fluid through the transparent fluid conducting means.

Even though an article is wanted and can be sold without, it can more readily be sold if some kind of an attraction is offered, or if attention is called to the sale of articles or matter to be sold by some kind of attractive mechanism.

Fruit juice is most delicious when it is fresh, and the sale of juice can easily be promoted and increased at a stand by extracting the juice in view of and visible to a patron.

However, the juice of some fruit is exceedingly rich in acids and not very much to be recommended to patrons to any appreciable extent without being properly prepared and cured.

The sale of such juice can best be promoted by simulating the extracting of juice while well prepared juice is being sold over the counter.

To simulate the extracting of juice in plain view of patrons, the illusion must be as perfect as possible to really make such a device attractive.

In my previous Patent No. 1,344,685 of June the 29th, 1920, it is well brought out how fruit can be circulated to be delivered again and again to the top of some displaying point to pass downwardly into a device of the appearance of a fruit crushing machine. Real fruit or artificial reproductions of fruit can be used for such displaying purposes.

Of course, real fruit may also be actually crushed and the juice extracted in a real crusher. In such a case, no fluid circulating apparatus is necessary, since the actual juice can be made to appear in a similar manner as the fluid of the fluid-circulating apparatus of such a device.

Any easily assimilated juice may therefore be extracted directly at a dispensing stand, while fruit with exceedingly much acid may be extracted apart from the displaying device in which case the extracting of juice is merely simulated in the displaying device at the dispensing stand as stated above.

Circulating the fruit as stated above, or by any common conveyor or other similar suitable means as is well known in the art, of which I am aware, such fruit is brought to the uppermost position, from which it visibly descends to be observed by a patron of a juice dispensing stand.

Such descending motion of fruit is arranged to terminate into a fruit-crushing or juice-extracting device, or towards a device of the appearance of a fruit-crushing device.

In Fig. 1, the highest visible position of fruit is indicated at 4. An opening 5 is provided in the cabinet 6, through which the descending of the fruit from its position at 4 may be observed.

In alignment with the opening 5 in the cabinet, and below that opening, a funnel-like structure 7 is provided, having an elongated opening 8, through which several pieces of fruit may be observed, as indicated at 9. These several pieces of fruit may also be caused to descend or allowed to move in the direction towards a fruit-crusher or juice-extracting device, or towards a device of the appearance of a fruit-crushing or juice-extracting device, indicated at 10.

A cross section of the funnel-like structure 7 is illustrated in Fig. 2, to show that the area of the structure is of a size to only allow fruit to pass one after the other in such descending movements.

If real fruit is used, it may rest one piece on top of the other, to be conveyed again to the top after having passed through such descending movements.

If artificial fruit is used, or if the real fruit is attached to a conveyor or pin-wheel of the type disclosed in my previous patent mentioned above, a second slot or opening is, of course, provided in the rear side of the funnel-like structure, as indicated at 11 in Fig. 2, to allow the supporting pins of the conveyor or wheel, by which the artificial or real fruit is supported, to pass through the funnel-like structure. Such details are not claimed in this application and therefore not particularly specified.

Real juice or any fluid is caused or allowed to pass downwardly over the bottom of the chute 12, illustrated in Figs. 1 and 3. This chute 12 is preferably disposed so that the juice or fluid may pass downwardly by gravity. A transparent covering 13 is preferably provided over the chute to keep the chute clean. Such covering may be of glass or any other transparent material.

A receptacle 14 is provided to receive the juice or fluid from the chute 12. The receptacle 14 is also preferably provided with a covering, as indicated at 15.

The faucet 16 is provided for drawing juice or fluid from the receptacle. A transparent tube 17 is provided to make such a drawing of juice or fluid from the receptacle visible to a patron of a dispensing stand. Rubber or other detachable nipples are provided at 18 to allow a removing of the tube 17 for cleaning purposes, since juice as well as any other fluid will stain the tube.

A faucet 19 is provided just below the tube 17 for drawing juice, to be served at the counter of a dispensing stand. The tube 20, connected to the faucet 19, of course, connects with a receptacle, not shown in the drawing, in which juice is kept to be dispensed.

If real fruit is crushed in the device, the juice thus obtained may be drawn from the tube 17 at the point or end 21, to be discharged into the juice-holding receptacle not shown in the drawing, as will easily be understood without further illustration or description. The end 21 of the tube 17 may also be connected by a rubber hose to the tube 20, so that juice may be directly drawn from the faucet 19 through the tubes 20 and 17.

If no real fruit is crushed in the device, and the fruit or artificial representations of fruit merely circulated as well known in the art, fluid is circulated over the bottom of the chute 12 and through the tube 17, by having a suitable circulating means, as a pump, provided as indicated at 22, connected with the end 21 of the tube 17, to discharge the fluid at 23 over the top or at a point to pass through the chute as stated above.

Having thus described my invention, I claim:

1. In a device of the class described embodying a resemblance of a device used for crushing articles such as fruit and the like and a device for carrying such articles in a certain aligned order one following the other in fixed relation to one another to be circulated in a certain plane, a funnel-like structure of an even area slightly larger than said articles and having means in the rear to allow portions of said carrying device and the articles thereon to pass through and having means in its front side by which such moving of the aligned and held articles may be seen as advancing in the direction of said crushing device while the structure covers from view other articles with the remaining portions of the carrying device and having means allowing the carrying device with the articles to so pass in a continuous manner through the funnel-like structure.

2. In a device of the class described having a part resembling a crusher for articles such as fruit and the like and a carrier for the articles with the articles held in a certain aligned and close order to move towards the crusher with a connecting means of comparatively narrow form holding the articles spaced from the carrier, an enclosure of an area to allow said articles to pass therethrough and having a guide slot in its rear side for said connecting means and a vision opening in its front side.

3. In a device of the class described, a funnel-like structure having an inlet at one end and an outlet at the other end for articles to pass through and being of a practically even area from the one end to the other end to slidingly encage such articles, there being a sight opening in the front side of the structure narrower than the size of the articles to pass through the structure and past the opening and a slot in the rear side of the structure of comparatively small width not to be noticeable through the sight-opening behind such of the articles passing behind the sight-opening adapted to allow the insertion of controlling means for the articles.

4. In a device of the class described, a funnel-like structure having an even area from one end to the other end and having a sight-opening through its side of comparatively smaller size than the said area so that articles may be passed through the structure of a size to fill out the area without falling through the sight-opening, the structure having furthermore a slot in a side away from the sight-opening by which the passing-through of articles past the sight-opening may be controlled.

5. In a device of the class described, a funnel-like structure having a passage of an even area from one end to the opposite with inlet and outlet openings and having a sight-opening in its front side narrower than the inside of the structure leaving narrow edges in the front side on both sides of the sight-opening and having other portions in the front side towards both ends of the structure to cover said inlet and outlet openings from view so that articles may be passed through the structure from the upper end to first appear below the upper one of said portions in the front side so as to simulate a guiding of such articles by the narrow front edges and the other sides of the structure when passed through in a close order one article on top of the other past the sight-opening to finally disappear behind the lower one of said portions in the front side.

6. In a device of the class described, a funnel-like structure having an even area from one to the opposite end and having an elongated sight-opening in its front side narrower than the inside of the width of the structure and comparatively longer than said width leaving the remaining portions of the structure extending from said opening to the opposite ends fully enclosed on all sides except for inlet and outlet openings near the opposite ends so that articles may be passed through the structure past the sight-opening without allowing such articles to fall through the sight-opening, the structure having a slot away from the front and from the sight-opening by which the passing of articles can be controlled in a fixed order from the inlet to the outlet openings.

In testimony that I claim the foregoing as my invention I have signed my name.

JAMES FAZIO.